United States Patent Office 3,784,540
Patented Jan. 8, 1974

3,784,540
PROCESS OF PREPARING SOLUBLE
HEMA-BASED POLYMERS
Karel Kliment, Princeton, and John M. Rutherford, Jr., North Brunswick, N.J., assignors to National Patent Development Corporation, New York, N.Y.
No Drawing. Filed Oct. 5, 1971, Ser. No. 186,796
Int. Cl. C08f 15/16, 15/18
U.S. Cl. 260—86.1 E                                    15 Claims

ABSTRACT OF THE DISCLOSURE

Solvent soluble solid hydrophilic polymers and copolymers of hydroxyethyl methacrylate and other hydroxyalkyl acrylates and methacrylates are prepared by polymerizing the monomer in an organic solvent or diluent for the monomer which is a non-solvent for the polymer having a coefficient of swelling of not over 2, preferably not over about 1.5 and a temperature of precipitation of 0 or above, preferably 30° C. or above, while maintaining the solids content in solution below that at which the polymer is still completely soluble in dimethyl formamide at 10% concentration. Gradual feeding of monomer can be used.

---

The present invention relates to the preparation of soluble polymers of hydroxy lower alkyl acrylates and methacrylates and the like.

In Chromecek Pat. 3,575,946 there is disclosed a process for preparing organic solvent soluble polymers of hydroxyalkyl acrylates and methacrylates, especially 2-hydroxyethyl methacrylate (HEMA) utilizing as a polymerization medium solvents, characterized by the interaction parameter $x$, which should be lower than 0.5 at the polymerization temperature and by their swelling coefficient for a crosslinked polymer, which will result when polymerizing in the absence of solvent in a value higher than 2. Another condition of suitability for the solvent is that it must be a good solvent for the resulting soluble polymer.

This method produces polymers which are soluble even when a high amount of crosslinking agent (e.g. diester) is present. The main disadvantage is that all the polymers are polymerized in solution and the polymer has to be isolated for many uses. This is both a time and labor consuming process, involving precipitation, washing, drying and pulverizing the polymer. Besides, neither the polymerization nor the isolation procedure can be adapted easily to continuous processing. The Chromecek patent expressly states that solvents having swelling coefficients below 2 cause the partial formation of insoluble polymers even under the conditions most favorable to the preparation of soluble polymers.

Chromecek Pat. 3,583,957 shows copolymerizing hydroxyethyl methacrylate with over 20% ethylene glycol dimethacrylate in the presence of toluene by a suspension polymerization technique to give an insoluble polymer. The use of suspension polymerization of hydroxyethyl methacrylate employing silicone oil or aromatic hydrocarbons such as xylene, toluene or benzene as suspending media is shown for example in New Zealand Pat. 149,467 (corresponding to Belgian Pat. 701,813) and Shepherd U.S. Pat. 3,575,123 and Shepherd Pat. 3,577,518. While such suspension procedures result in the production of soluble polymers there also is formed polymer which is not completely soluble in dimethyl formamide at 10% solids concentration.

Suspension polymerization eliminates most of the disadvantages associated with the previous solution procedure described in Chromecek Pat. 3,575,946 although until now they have had the disadvantages noted previously.

The disadvantages of previous suspension polymerization of hydroxyethyl methacrylate containing 0.05 to 1% of the diester (and similar hydroxyalkyl acrylates and methacrylates) have now been overcome and a polymer which is completely soluble in dimethylformamide at 10% solids is obtained if certain critical conditions are observed.

(1) The polymerization is carried out in an organic solvent or diluent for the monomer in which solvent or diluent the polymer is insoluble and which has a coefficient of swelling (B) for a corresponding cross-linked polymer of between 1.0 and 2.0, e.g. 1.99. The preferred upper limit is 1.5 and the most preferred upper limit is 1.2.

(2) The precipitation of the polymer as it is formed should be carried out at a temperature of 0° C. or above, preferably 30° C. or above.

(3) The solids content in the solution in which polymerization occurs should be no more than that at which the polymer will still be completely soluble in dimethyl formamide at 10% concentration. The percent solids in solution means the polymerizable monomer present and any polymer which has not precipitated out.

The monomers are initially completely soluble and as they polymerize the polymer precipitates out. It is essential that the polymer not stay in solution at the polymerization temperature.

Polymerization can be carried out at 30° C., preferably at least 40° C., up to the boiling point of the solvent (or above the boiling point if the polymerization is carried out under pressure). The diluents used in the present invention as indicated should have $T_{pr}$ (temperature below which the polymer will precipitate) of 0° C. or up, preferably 30° C. or up and more preferably over 50° C. The solvents having a $T_{pr}$ above 50° C. are preferred because more initiators can be used and a more rapid polymerization can be effected.

The process of the present invention is ideally adapted to continuous polymerization since the polymer as it is formed precipitates out as a fine powder even without vigorous stirring. Thus particles are readily formed in the size of 30 microns or smaller.

While the gradual feeding of monomers permits more total solids to be formed while keeping the monomer concentration low, the solids in solution should not exceed the values specified above. The maximum permitted solids is set forth below in Table 1 in Example 1.

As indicated in the process of the invention, polymer formed can be continuously removed from the reaction pot. The precipitation step is eliminated and washing and drying of the polymer is greatly facilitated as a fine powder results, e.g. 1 to 1000 microns, which does not require any additional grinding or pulverizing. The gradual feeding of the monomer or monomers to the reaction mixture during polymerization is much more efficient than with the solution polymerization since the polymer formed as solid particles does not swell in the solvent or mixture of solvents used as a polymerization medium and therefore cannot participate in further polymerization. In contrast during solution polymerization even when gradual feeding is employed, the polymer formed is present as a live solution and can react further. As a result soluble products can be obtained in the suspension process of the invention when monomer or monomers are fed gradually under conditions that give insoluble products if all of the monomer is added at the beginning.

While overall solids content in the polymerization mixture is lower for the suspension polymerization of the invention than for the solution polymerization procedure, this ratio in regard to polymer recovered can be inverted by using gradual feeding of the monomer or monomers in the present process.

As previously pointed out the allowable diester, e.g. ethylene dimethacrylate, is 1% based on the HEMA, although samples with 3% diester concentration yielded soluble products at low solid levels. Optimum diester concentration is between 0.1 and 0.6% based on HEMA. Commercial HEMA samples normally lie in this region. The solids content for a batch polymerization can vary from 1 to as high as 35% with some diluents. Usually the concentration is 4 to 16%. Preferably the diluent is chosen so that the concentration can be at least 10% solids because of recovery expense, cost of heating, etc.

In the process of the invention conversions to polymer are high, usually over 90%, and the polymer produced has intrinsic viscosities varying from 0.2 to 1.4.

While the hydrophilic monomer is preferably hydroxyethyl methacrylate, there can also be used hydroxyethyl acrylate, hydroxypropyl acrylate, hydroxypropyl methacrylate, hydroxyethoxyethyl acrylate, hydroxethoxyethyl methacrylate, hydroxypropoxypropyl acrylate and hydroxypropoxypropyl methacrylate. As the cross linking monomer there can be used ethylene glycol dimethacrylate (ethylene dimethacrylate), propylene glycol dimethacrylate, ethylene glycol diacrylate, propylene glycol dimethacrylate, diethylene glycol diacrylate, diethylene glycol dimethacrylate, dipropylene glycol dimethacrylate, dipropylene glycol diacrylate.

The hydroxy lower alkyl acrylate or methacrylate can also be copolymerized with up to 50% of acrylic acid or methacrylic acid or up to 50% of a quaternary ammonium acrylate or methacrylate, e.g. 3-trimethyl ammonium-2-hydroxy-propyl methacrylate or other hydrophilic monomer. There can be copolymerized up to 30% of other monomers, e.g. lower alkyl acrylates and methacrylates, such as methyl methacrylate, butyl acrylate, ethyl acrylate, methyl acrylate, ethoxyethyl acrylate, methoxyethyl acrylate, ethoxyethyl methacrylate, ethyl methacrylate, styrene, vinyl acetate, acrylonitrile, dimethylaminoethyl acrylate, dimethylaminoethyl methacrylate, t-butylaminoethyl methacrylate, di - n - butyl-aminoethyl methacrylate, vinyl pyrrolidone.

There can be used any conventional polymerization catalyst, e.g. ultraviolet light or free radical catalysts such as t-butyl peroctoate, isopropyl percarbonate, benzoyl peroxide, cumene hydroperoxide, dicumyl peroxide, 1,3-bis-(t-butylperoxyisopropyl) benzene, methyl ethyl ketone peroxide, acetyl peroxide, di-t-butyl peroxide, t-butyl hydroperoxide, and other peroxides such as any of those set forth in the Encyclopedia of Polymer Science and Technology, vol. 9, pp. 818–827 (1968), azo compounds such as azodiisobutyronitrile as well as any of the other azo compounds set forth in Hunt Pat. 2,471,959. The catalyst is usually present in an amount of 0.05 to 1% of the polymerizable monomer.

Unless otherwise indicated all parts and percentages are by weight.

Methyl Cellosolve acetate is methoxyethyl acetate.

EXAMPLE 1

The polymerization border-lines for HEMA were run in 25 gram ampules at two temperatures, 80 and 90° C. The concentration of cross-linking agent (ethylene glycol dimethacrylate) $C_x=0.4$ wt. percent based on HEMA, the concentration of polymerization initiator (tert-butylperoctoate) $C^I=0.5$ wt. percent based on HEMA. For every solvent tested a series of experiments was run, varying the HEMA-solvent ratio in increments of two percent in the critical region, i.e. region where both the completely soluble and completely insoluble polymers were found. The amounts of HEMA and respective solvent were calculated as weight percent of the total and converted to cubic centimeters. Both HEMA, containing the specified amount of cross-linking agent and of polymerization initiator, and the solvent were dosed from burettes into a volumetric flask, mixed thoroughly and filled into dry ampules. The filled ampules were purged for 2 minutes with nitrogen, flame-sealed and immersed into a thermostated oil bath of the corresponding temperature for 16 hours.

After the polymerization was completed, the ampules were removed from the bath, cleaned from the bath oil and cooled down. Where a precipitate formed during polymerization, the $T_{pr}$ or precipitation temperature was noted as over 80 or over 90° C. In the other case, where clear solution resulted, the ampules were opened and the temperature of the solution was measured during the cooling-down period. As the $T_{pr}$ there was chosen the mean value of the temperature at which the first clouding of the solution during the cooling cycle, and the temperature when the solution cleared during the subsequent heating cycle. It should be noted that the $T_{pr}$ is influenced by the concentration of the polymer in the solution, usually rising with increasing concentration.

The resulting polymers were dissolved as 10 weight percent solutions in dimethylformamide (DMF) at room temperature. The values given in subsequent Table 1 denote the HEMA concentration in the total mixture at which the resulting polymer was totally soluble in the DMF in less than 24 hours as a completely clear, particle-free solution at room temperature. Two percent higher monomer concentration yields only partially soluble polymer, leaving cloudy solutions with suspended particles even after prolonged dissolving periods or at higher temperatures.

The coefficients of swelling, B, in the table were measured or crosslinked (0.4 wt. percent) HEMA polymers, cut into blocks roughly 5 x 20 x 2 millimeters, dried to constant weight and swelled in the corresponding solvents until equilibrium was reached. This can take from 5 to 40 days. B values express a ratio of the weight in the solvent picked and the original weight of the dry polymer.

TABLE 1.—CONCENTRATION OF HEMA IN SOLVENT AT WHICH A POLYMER COMPLETELY SOLUBLE IN DMF IS FORMED

[$C_x=0.4$ wt. percent, $C_I=0.5$ wt. percent]

| Solvent | Temperature, ° C. | | B | $T_{pr}$,° C. |
| --- | --- | --- | --- | --- |
| | 80 | 90 | | |
| Butylether | 4 | | 1.006 | >90 |
| Acetone | 14 | | 1.580 | >80 |
| Methylpropylketone | 12 | 12 | 1.001 | >90 |
| Methylisobutylketone | 12 | 12 | 1.000 | >90 |
| Ethylacetate | 11 | 12 | 1.006 | >80 |
| Propylacetate | 12 | 14 | 1.000 | >90 |
| Butylacetate | 13 | | 1.007 | >80 |
| Amylacetate | 7 | | 1.009 | >90 |
| Isopropylacetate | 12 | 16 | 1.001 | >90 |
| Isobutylacetate | 12 | 12 | 1.003 | >90 |
| Methylcellosolveacetate | 16 | 16 | 1.009 | >90 |
| 2-ethylhexylacetate | 12 | 12 | 1.000 | >90 |
| n-Propanol | 26 | 26 | 1.270 | 42–43 |
| Isopropanol | 23 | 28 | 1.530 | 15–16 |
| n-Butanol | 24 | 26 | 1.010 | 64–68 |
| Sec. butanol | 28 | 34 | 1.350 | 10–12 |
| Isobutanol | 30 | 32 | 1.006 | 65–70 |
| 1-butanol-1-methyl | 35 | 35 | 1.000 | 52–54 |
| 1-butanol-2-methyl | 30 | | 1.000 | 75–78 |
| 2-butanol-2-methyl | 16 | 18 | 1.040 | 8–10 |
| 1-propanol-2,2 dimethyl | 16 | 18 | 1.070 | 3–5 |
| 1-pentanol | 10 | 12 | 1.000 | 85–90 |
| Isopentanol | 12 | 12 | 1.000 | 75–78 |
| Toluene | 7 | | 1.017 | >80 |
| Cyclohexanol | 17 | 19 | 1.180 | 10–12 |
| Carbon tetrachloride | 4 | 4 | 1.004 | >90 |
| Silicone oil | 2 | | | (¹) |

¹ Insoluble.

EXAMPLE 2

Comparison of solution and precipitation polymerization of HEMA using gradual addition of monomer during polymerization All polymerizations were conducted in a 2-litre kettle equipped with stirrer, reflux condenser, dropping funnel and thermometer. Inert gas nitrogen was fed over the surface during the whole reaction. The kettle was immersed in a temperature-controlled bath, maintaining the desired temperature in a range ±1° C.

The polymerizations were conducted to prove that the gradual addition of monomer during polymerization is more effective than one shot addition of monomer when the polymerization is conducted with simultaneous precipitation because the resulting polymer is being precipitated out of the solution and cannot take place in subsequent polymerization. As a diluent/solvent n-butanol was chosen, as its precipitation temperature lies between 64–66° C. The solution polymerization was conducted at 80° C., using tert-butylperoctoate as a catalyst, precipitation polymerization at 60° C., using diisopropylpercarbonate as a catalyst. In both instances the amount of catalyst, based on HEMA was 0.3 weight percent. The HEMA used was neutralized, not distilled, containing 0.32 weight percent of diester (ethylene glycol dimethacrylate) no methacrylic acid and 0.5 weight percent of other matter (diethyleneglycol monomethacrylate, isobutyrates and low-boilers).

The total amount of reaction mixture used in all instances was 1000 grams. The corresponding amount of solvent/diluent was charged into the kettle and brought to the reaction temperature. Monomeric mixture (monomer and catalyst) was fed either as one shot or gradually for two hours. After all of the monomeric mixture was present in the kettle, the reaction was allowed to proceed for another four hours. The polymers formed were tested as to solubility in dimethylformamide as 10 weight percent solutions at room temperature.

Results:

At 40% solids, no gradual feeding, solution polymerization resulted in gelation after 3 hours and an insoluble polymer. Precipitation polymerization yielded a soluble polymer product at 40% solids. On gradual feeding, both polymerizations yielded soluble products. The rate of feeding was such that the percent solids in solution never exceeded 24%.

At 50% solids solution polymerization yielded an insoluble product even with gradual feeding, while precipitation polymerization yielded a fully soluble product.

EXAMPLE 3

The polymerization was carried out in a 2 liter resin kettle fitted with a ground glass stirring rod and Teflon blade connected to a heavy duty stirrer set at 350 r.p.m., a pressure balanced feed tank with a nitrogen inlet, a condenser with a nitrogen outlet, and a thermometer. The resin kettle was heated by an electrical heating tape connected to a variable transformer, and cooled by a water bath. Toluene, 1200 parts, was added to the reactor, and a solution of 0.76 part bis(4-t-butylcyclohexyl) peroxydicarbonate in 126.3 parts hydroxyethyl methacrylate was placed in the feed tank. The hydroxyethyl methacrylate contained 2.0 percent ethylene glycol dimethacrylate. The apparatus was assembled and purged with nitrogen at 1.0 s.c.f.h. (standard cubic feet per hour) while the resin kettle was heated to 65° C. After one hour the purge rate was reduced to 0.1 s.c.f.h., and the monomer-initiator solution was then added over a two-hour period. After two additional hours at 65° C. the stirred slurry was cooled to room temperature, filtered, washed with about 1000 parts ethyl acetate, and dried at room temperature. There were obtained 122.7 parts of finely divided solid poly(hydroxyethyl methacrylate) having a reduced specific viscosity of 0.81 dl./gm. when measured at 25° C. in 2-methoxyethanol at a concentration of 0.5 gm./dl. It was completely soluble in DMF at 10% solids concentration.

EXAMPLE 4

The polymerization was carried out as described in Example 3, except that ethyl acetate was used in place of the toluene. The dried solid product consisted of 102.8 parts and had a reduced specific viscosity of 0.44 in 2-methoxyethanol. It was completely soluble in DMF at 10% solids.

EXAMPLE 5

The polymerization was carried out as described in Example 3, except that heptane was used in place of the toluene, and the temperature was 80° C. instead of 65° C. There were obtained 122.7 parts of solid polymer with a reduced specific viscosity of 1.38 in 2-methoxyethanol. It was completely soluble in DMF at 10% solids.

EXAMPLE 6

The polymerization was carried out as described in Example 3, except that n-butanol containing 2.5 percent benzyl alcohol was used in place of the toluene, and the temperature was 45° C. instead of 65° C. There were obtained 60 parts of solid polymer with a reduced specific viscosity of 0.87 in 2-methoxyethanol. It was completely soluble in DMF at 10% solids.

EXAMPLES 7–10

Additional examples, carried out substantially as indicated in Example 3, which further exemplify the process are summarized in Table 2.

TABLE 2

| Example number | Monomer concentration, percent | Temp., °C. | Catalyst concentration,[2] phr. | Monomer feed time, hrs. | Recovered polymer,[3] percent | Reduced viscosity[4] |
|---|---|---|---|---|---|---|
| 3 | 9.5 | 65 | 0.6 | 2 | 95 | 0.81 |
| 7 | 9.5 | 95 | 0.6 | 2 | 70 | 0.43 |
| 8 | 9.5 | 65 | 0.3 | 2 | 98 | 1.46 |
| 9 | 9.5 | 65 | 0.6 | 4 | 100 | 0.68 |
| 10 | 20.0 | 95 | 0.6 | 4 | 94 | 0.49 |

[1] Based on total of monomer and toluene diluent.
[2] Based on monomer.
[3] Based on monmer charged.
[4] Run in 2-methoxyethanol at 0.5 g./dl. concentration at 25° C.

In all cases the solid polymer obtained was completely soluble in DMF at 10% solids.

EXAMPLES 11–17

In the same manner as Example 3, several copolymers were prepared by replacing a portion of the hydroxyethyl methacrylate with one or more other monomers and, in some cases, washing the filtered copolymer with toluene in place of the ethyl acetate. These are summarized in Table 3.

TABLE 3

| Example number | Comonomer | Comonomer level,[1] percent | Wash liquid | Recovered polymer, percent | Reduced viscosity |
|---|---|---|---|---|---|
| 11 | Methacrylic acid. | 10 | Et Ac | 100 | 1.24 |
| 12 | "Sipomer Q-1" | 10 | Toluene | | |
| 13 | Styrene | 10 | Et Ac | 87 | |
| 14 | N-vinyl pyrrolidone. | 10 | Et Ac | 93 | |
| 15 | Acrylonitrile | 10 | Toluene | | |
| 16 | Butyl acrylate | 25 | Et Ac | 66 | |
| 17 | {Ethoxyethyl acrylate. Hydroxypropyl acrylate. | {8 2} | Et Ac | 93 | 0.52 |

[1] Based on total monomer charged.

What is claimed is:

1. A process of preparing a solid hydrophilic polymer having complete solubility at 10% solid in dimethyl formamide comprising polymerizing a mixture of polymerizable monomers consisting essentially of (1) a member selected from the group consisting of a hydroxy lower alkyl acrylate, a hydroxy lower alkyl methacrylate, a hydroxy lower alkoxy lower alkyl acrylate and a hydroxy lower alkoxy lower alkyl methacrylate having two to three carbon atoms in each alkyl or alkoxy group, (2) 0.05 to 1% based on (1) of the corresponding diester of the same alkylene glycol or dialkylene glycol of acrylic acid or methacrylic acid as of the monoester (1) and up to 30% of a third copolymerizable monoethylenically unsaturated monomer based on the total monomers, in a solvent for the monomers in which the polymer is insoluble, said solvent having a coefficient of swelling for a corresponding cross-linked polymer of (1), (2) and (3) of between 1.0 and 2.0, the solvent having a $T_{pr}$ of 0° C or above, the term $T_{pr}$ being the temperature below which the polymer will precipitate, the polymerization being carried out at at least 30° C. and the solids content of the mixture of polymerizable materials in the solution and in which polymerization occurs and of the hydrophilic polymer being maintained at no more than that at which the said hydrophilic polymer will still be completely soluble in dimethyl formamide at 10% concentration.

2. A process according to claim 1 wherein the monomers are fed gradually to maintain the solids in solution below the level at which the polymer is still completely soluble in dimethyl formamide at 10% solids.

3. A process according to claim 1 wherein the polymerizable monomers consist essentially of (1) and (2).

4. A process according to claim 1 wherein monomer (1) is hydroxyethyl methacrylate and monomer (2) is ethylene dimethacrylate.

5. A process according to claim 4 wherein the monomers are fed batchwise.

6. A process according to claim 4 wherein the monomers are fed gradually to maintain the solids in solution below the level at which the polymer is still completely soluble in dimethyl formamide at 10% solids.

7. A process according to claim 4 wherein the solvent has a coefficient of swelling of not over 1.2.

8. A process according to claim 7 wherein the solvent has a coefficient of swelling of not over 1.2.

9. A process according to claim 8 wherein the process is carried out at a solids concentration of over 10% in the solvent chosen.

10. A process according to claim 8 wherein the solvent has a $T_{pr}$ of over 30° C.

11. A process according to claim 7 wherein the solvent has a $T_{pr}$ of over 30° C.

12. A process according to claim 4 wherein the monomers consist essentially of (1) and (2).

13. A process according to claim 12 wherein the solvent has a coefficient of swelling of not over 1.5.

14. A process according to claim 13 wherein the solvent has a coefficient of swelling of not over 1.2.

15. A process according to claim 4 wherein the solvent has a coefficient of swelling of not over 1.2 and the monomer (2) is present in an amount of 0.1 to 0.6%.

References Cited
UNITED STATES PATENTS 3,575,946  4/1971  Chromecek et al. ___ 260—80.81
3,699,089  10/1972  Wichterle _____ 260—80.81

HARRY WONG, Jr., Primary Examiner

U.S. Cl. X.R.

204—159.22; 260—31.2 R, 32.6 R, 32.8 R, 33.2 R, 33.4 R, 33.6 UA, 33.8 UA, 80.72, 80.73, 80.8, 80.81